July 8, 1969  R. L. PICKHOLTZ  3,453,870
SELF-CONTAINED MASS MEASUREMENT SYSTEM
Filed March 21, 1966
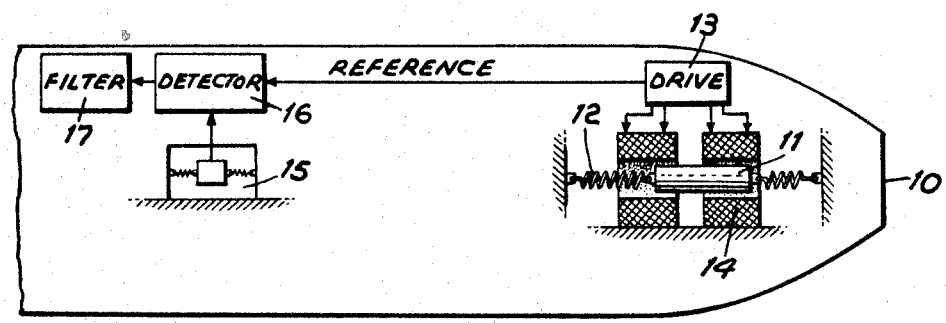
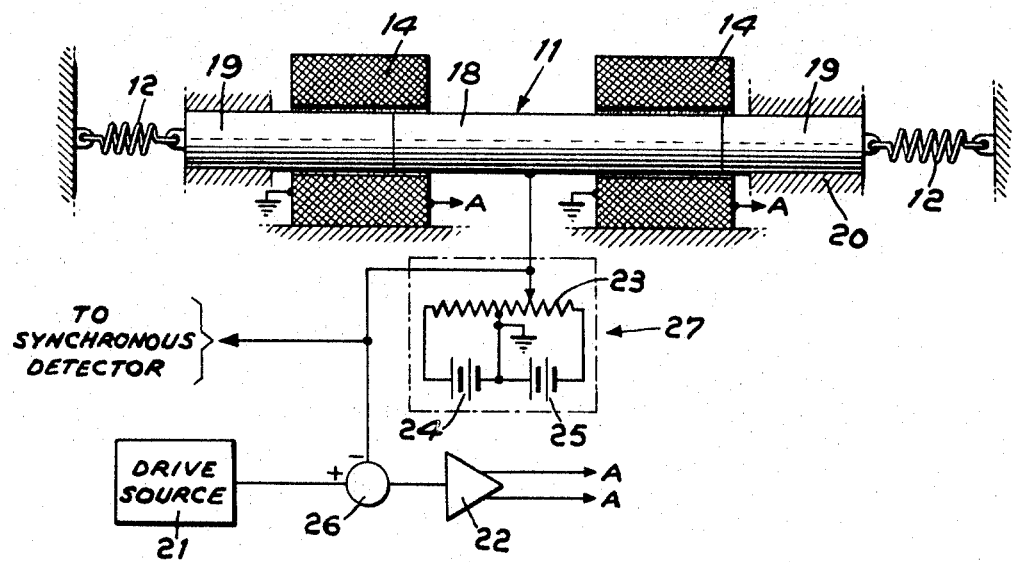
INVENTOR.
RAYMOND L. PICKHOLTZ
BY Richard J. Seligman
ATTORNEY United States Patent Office 3,453,870
Patented July 8, 1969

3,453,870
SELF-CONTAINED MASS MEASUREMENT SYSTEM
Raymond L. Pickholtz, Brooklyn, N.Y., assignor to International Telephone and Telegraph Corporation, a corporation of Delaware
Filed Mar. 21, 1966, Ser. No. 535,816
Int. Cl. G01n 29/00
U.S. Cl. 73—67                                                           8 Claims

ABSTRACT OF THE DISCLOSURE

In a mass measuring system, a drive source coupled via a summing circuit and an amplifier to electromagnetic coils causes a test mass, coupled to a space vehicle by springs, to vibrate. A feedback transducer coupled to said test mass provides a first signal to said summing circuit to control said vibrations. The test mass vibrations cause the space vehicle to vibrate according to its mass. An accelerometer responsive to space vehicle vibrations is coupled to a synchronous detector which receives a second signal from said transducer to provide a signal which when filtered is a measure of space vehicle mass.

---

This invention relates to a mass measurement system and more particularly to one internal to a spacecraft.

In certain spacecraft applications it is a requisite that the spacecraft's mass be precisely determined. For example, the need for mass measurement arises when it is desired to effectively utilize low thrust engines (such as plasma, or ion rockets) for space rendezvous or precision touchdown. The mass is also required to compute the drag decelleration of a missile upon re-entry into an atmosphere.

Mass is generally not known accurately because of loss of fuel and other wastes.

Accordingly, it is an object of this invention to provide a self-contained spacecraft mass measurement system.

The above-mentioned and other features and objects of this invention will become more apparent by reference to the following description taken in conjunction with the accompanying drawings, in which:

FIG. 1 is a pictorial representation of a spacecraft illustrating a self-contained mass measurement system; and FIG. 2 is a sketch illustrating apparatus for producing internally induced perturbations within the spacecraft of FIG. 1.

Briefly, the herein-described embodiment of my invention provides a self-contained spacecraft mass measurement system including an internal test mass which is suspended within the spacecraft, means for vibrating the test mass, and means for measuring the resultant perturbations of the spacecraft caused by the resultant minor oscillations of the spacecraft in reaction to the vibration of the internal mass; this reaction of the spacecraft is in proportion to the ratio of the spacecraft mass to the internal test mass.

Referring to FIG. 1, there is therein illustrated a sketch of a spacecraft mass measurement system according to the invention. Contained within a spacecraft 10 the mass of which is to be measured is a test mass 11 the mass of which is known. Test mass 11 is suspended within spacecraft 10 such that it can be perturbed in a known manner, for example, suspended using springs 12. Test mass 11 suspended within spacecraft 10 is caused to be vibrated in a sinusoidal (or other) manner relative to the frame of the vehicle 11 at a frequency $f_0$ with an amplitude $d$. This vibration can be induced electromagnetically using a drive source 13 and coils 14; a more detailed description follows hereinafter. Assuming no acceleration of the spacecraft, it, plus mass 11, is an isolated system so that the center of gravity of the entire spacecraft is fixed in a reference frame traveling uniformly with the vehicle. Therefore, when mass 11 moves a distance $d$, the remainder of the spacecraft 10 must move a distance $$\frac{m}{M}d$$

(M is the mass of the spacraft, $m$ is the mass of the test mass) along the same axis but in the opposite direction (all measured in the frame of the center of gravity). If the induced motion of $m$ is $d_2 \sin 2\pi f_0 t$ the acceleration of the vehicle proper would be $$(2\pi f_0)\frac{m}{M}d \sin 2\pi f_0 t$$

which is what would be measured by an accelerometer 15 mounted to the frame of the spacecraft. The output of accelerometer 15 is synchronously detected in a standard type phase sensitive detector 16 with the output therefrom passed through an extremely narrow low pass filter 17. The resulting DC voltage (or current) is then inversely proportional to M, the mass of spacecraft 10, and a meter, telemeter or automatic digital readout can be so calibrated when the vehicle is accelerated due to thrust and/or gravitation. The accelerometer will read additionally, the component of this acceleration along the sensitive axis of the accelerometer.

It is the unique advantage of this invention that these induced accelerations are selected even in a background of accelerations due to vibration and/or re-entry and/or thrust by virtue of the synchronous operation.

The mass 11-spring 12 combination may be made resonant to the driving source to minimize the drive power required. The determination of the spring constants and other details of the construction of the internal mass mounting system are well-known as evident by the current state of loud speaker diaphragm construction arts.

In order to permit the use of a resonant structure without damage thereof during excess thrust or other transient or extraneous conditions the resonant structure may be rigidly clamped to the spacecraft frame during periods of excessive extraneous disturbance, and otherwise resiliently suspended within the vehicle during periods of deliberately induced mass measurement vibrations.

Illustrated in FIGURE 2 in greater detail are the drive mechanism for perturbing mass 11 as well as the means for providing a reference signal for synchronous detector 16. A mass 11 comprising a soft iron portion 18 and non-magnetic portions 19 are attached to the spacecraft by spring 12. Mass 11 is mounted for lateral movement in bearings 20. A drive source 21 drives a push-pull amplifier 22 with the respective outputs therefrom being used to drive a pair of coils 14 for providing electromagnetic energy to cause mass 11 to vibrate. The displacement which mass 11 traverses when vibrated is detected by pickoff 27 which includes resistive elements 23 and voltage sources 24 and 25. This displacement is fed to synchronous detectors 16 as the reference input thereto. A summing circuit 26 is provided to limit the drive to coils 14 when an excessive displacement of mass 11 takes place, for example, when there is an extraneous produced acceleration along the pertinent axis.

An alternative to the method described above is to vibrate the test mass 11 with random noise or psuederandom noise as generated by a linear shift register, for example. The output of accelerometer 15 is then synchronously detected using the noise source as reference and then narrow band low pass filtered as before. The advantage of this method is that it is insensitive to natural resonance which may be present in the vehicle.

It is desirable that the axes of the vibrating mass and the accelerometer be in line with an axis of symmetry of the vehicle passing through the center of gravity of the vehicle in order to avoid inducing any angular momentum. If this is not possible, then two such units can be used to balance the torque.

As an example of performance of this system the following is given:

Assume the spacecraft 10 has a mass of 10,000 kg. and the test mass 11 has a mass of 0.1 kg. Now if the vibrating frequency $f_0$ is 100 c.p.s. with amplitude $d$ of 0.1 meter, the accelerometer 15 (if it had a flat frequency response beyond 100 c.p.s.) would have a sinusoidal output with amplitude $(2\pi \times 100)^2 \times 10^{-6}$ m./sec.$^2$=0.3944 m./sec.$^2$ or 0.0402 g. This acceleration can be easly measured with precision using commercially available accelerometers. If the DC output filter has a bandwidth of 0.1 c.p.s. and the spectral density of the vibration extends to 1 kc., the reduction factor due to synchronous detection is 20,000:1. The reduction factor due to other disturbances such as gravitation or constant thrust can be made as high as $10^6$:1.

I claim:
1. Apparatus for measuring the mass of a vehicle comprising:
   an internal test mass suspended within said vehicle; means for vibrating said test mass; means for measuring the resulting perturbations of said vehicle, said perturbation measurement being a function of the mass of said vehicle; means for transducing into electrical signals the vibrations of said test mass, and means for synchronously detecting the outputs from said means for measuring resulting perturbations and said transducing means wherein the output from said transducing means provides a reference input to said synchronous detection means, whereby an output signal from said synchronous detection means will be a function of the mass of said vehicle.
2. Apparatus for measuring the mass of a space vehicle according to claim 1 wherein said means for measuring resulting perturbations includes an accelerometer.
3. Apparatus for measuring the mass of a space vehicle according to claim 2, further including means for filtering the output from said detection means including a narrow low pass filter.
4. Apparatus for measuring the mass of a space vehicle according to claim 1 wherein said test mass is suspended within a pair of coils and said means for vibrating said test mass includes a drive source, and a push-pull amplifier coupled to said drive source with the output thereof being coupled to said coils.
5. Apparatus for measuring the mass of a space vehicle as in claim 4 further including a summing device coupled to said drive source, said means for transducing, and said push-pull amplifier such that excessive displacement of said test mass causes a reduction of the drive to said push-pull amplifier.
6. Apparatus according to claim 1 wherein said test mass is harmonically vibrated.
7. Apparatus according to claim 1 wherein said test mass is randomly vibrated.
8. Apparatus according to claim 1 wherein said test mass is pseudo-randomly vibrated.

References Cited
UNITED STATES PATENTS
2,305,783   12/1942   Heymann et al. _____ 73—67
3,339,400   9/1967   Banks _____ 73—67.1

RICHARD C. QUEISSER *Primary Examiner.*

J. R. FLANAGAN, *Assistant Examiner.*

U.S. Cl. X.R.

73—116